Figure 1:
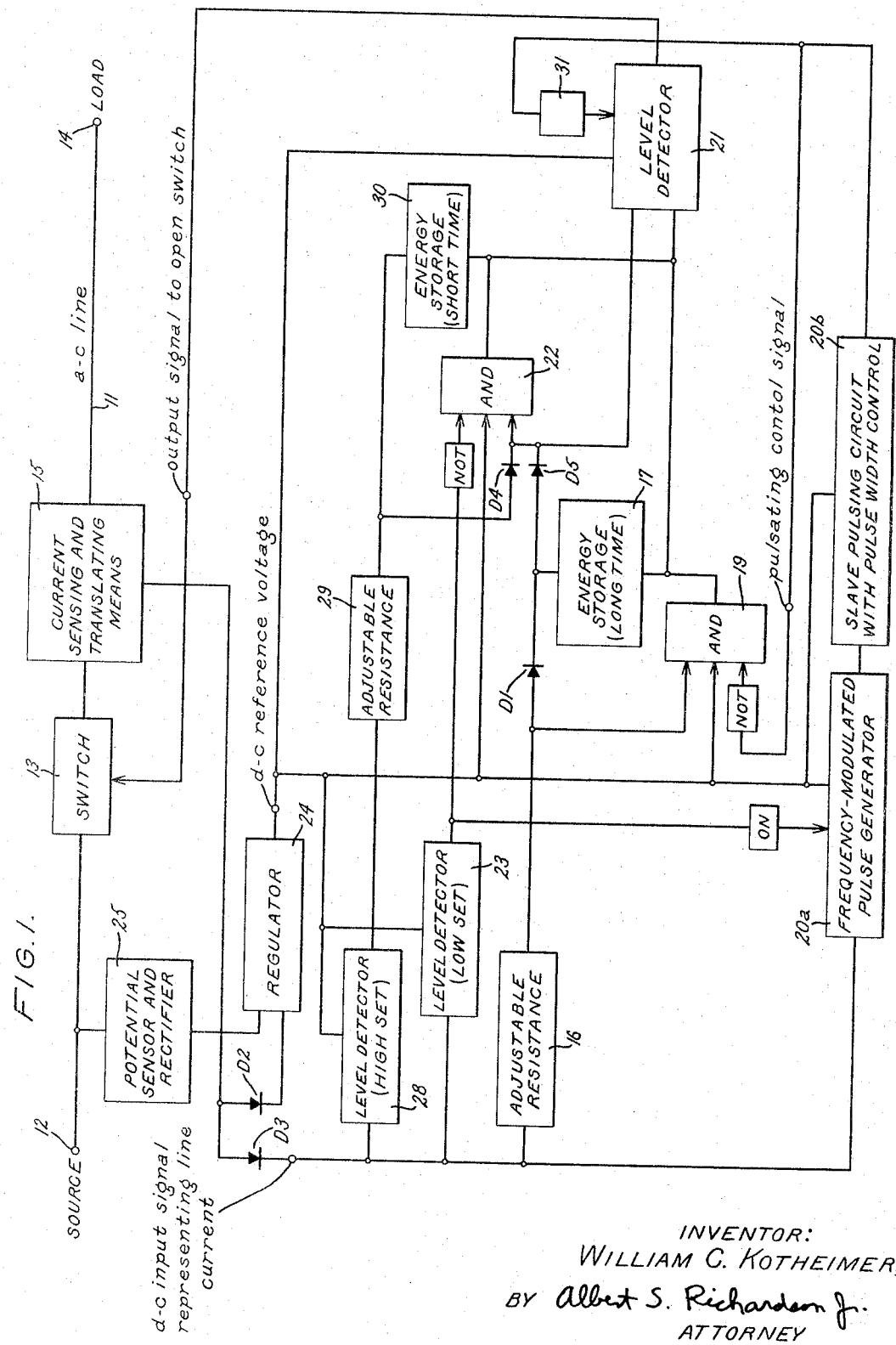

May 2, 1967 W. C. KOTHEIMER 3,317,794
OVERCURRENT PROTECTIVE MEANS
Filed April 13, 1964 2 Sheets-Sheet 1

INVENTOR:
WILLIAM C. KOTHEIMER,
BY Albert S. Richardson Jr.
ATTORNEY

May 2, 1967 W. C. KOTHEIMER 3,317,794
OVERCURRENT PROTECTIVE MEANS
Filed April 13, 1964 2 Sheets-Sheet 2
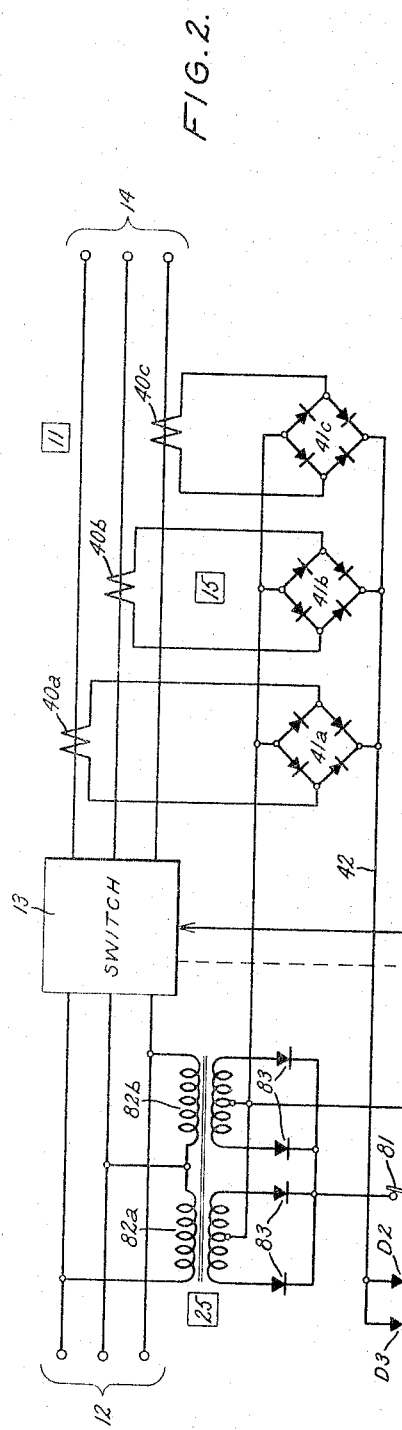
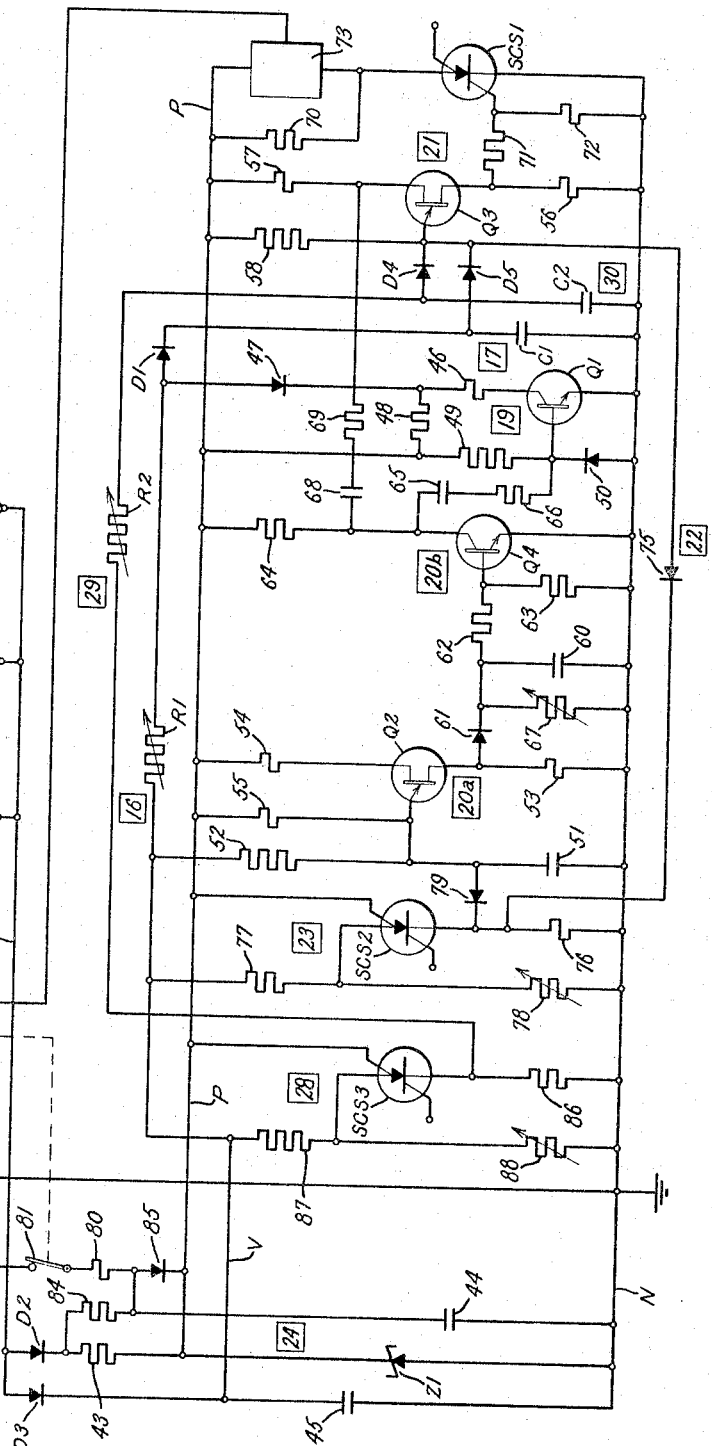
FIG. 2.
INVENTOR:
WILLIAM C. KOTHEIMER,
BY Albert S. Richardson Jr.
ATTORNEY 3,317,794
OVERCURRENT PROTECTIVE MEANS
William C. Kotheimer, Drexel Hill, Pa., assignor to General Electric Company, a corporation of New York
Filed Apr. 13, 1964, Ser. No. 359,274
10 Claims. (Cl. 317—36)

This invention relates to protective means for electric current circuits, and more particularly it relates to an improved overcurrent responsive protective device utilizing an electric energy accumulating element, such as a capacitor, to delay operation of the device for a length of time that is inversely related to the amount of overcurrent in the protected circuit.

In the art of protecting electric lines or circuits, it is common practice to use devices or relays designed to operate, in response to abnormal circuit conditions, with a time delay inversely related to the severity of the abnormality. For example, the overcurrent protective relay having an inverse-time-overcurrent operating characteristic is well known in the art, as is the time-over-current trip device for electric circuit breakers. In order to provide optimum circuit protection whenever an overcurrent or fault (short circuit) condition occurs, the operating characteristic of such a device should ideally approach an $I^2t$-equals-a-constant relationship, that is, the operating time ($t$) of the protective device should vary inversely in proportion to approximately the second power of the circuit current ($I$). Such an operating characteristic will match the thermal damage characteristic of the protected circuit under abnormal conditions, when the threat of damage is proportional to the square of the current value.

While inverse-time-overcurrent devices employing mechanical or electromechanical construction to obtain the requisite time delay have had a long and successful history, such prior art devices do have some recognized drawbacks. The principal ones, perhaps, are the relatively large amount of input energy required for reliable operation and the inherent inertia of the movable armature or rotor of the device. Consequently, there is a trend in the art today to accomplish the same functional result by means of "static" circuitry, i.e., by apropriate combinations of semiconductors and other physically small, low-power solid-state components having no moving parts.

Typically such a static arrangement employs, in combination, electric energy storing means comprising a reactance element, such as a capacitor, and level detecting means responsive to the reactance element accumulating a predetermined critical level of energy. By suitably energizing the energy storing means in response to an overcurrent condition in the circuit whose protection is desired, the reactance element attains the aforesaid critical level of energy (and hence the level detecting means will operate )on the expiration of a time delay inversely related to the degree of overcurrent involved.

There are several different ways in which the electric energy storing means can be energized to obtain or approximate this result. One common approach, for example, has been to provide a continuous D.-C. energizing signal whose magnitude is a function of the amount of overcurrent in the protected circuit. Another approach has been to effect intermittent energization of the energy storing means by a constant-magnitude signal, with the number of energizing increments per unit of time being varied as a function of overcurrent magnitude. In order to obtain an $I^2t=K$ operating characteristic (K is a constant), it has been necessary when using the latter approach to make the repetition rate of the intermittent energizing signal a nonlinear function of overcurrent magnitude.

A general object of the present invention is the provision of a new static time delay protective device, and a more specific object is the provision of an overcurrent protective device of the kind employing an intermittently energized reactance element, the device being so designed that an $I^2t=K$ operating characteristic can be closely approached without requiring a non-linear relationship between the rate of energization and the magnitude of overcurrent.

Another objective of my invention is to provide improved overcurrent protective means that includes an incrementally charged capacitor energized in accordance with an electric quantity that varies with the magnitude of current in the circuit being protected.

In carrying out my invention in one form, a protective device is formed by providing, in combination, electric energy storing means and means for supplying the energy storing means with a succession of fixed-duration energizing pulses the amplitude and frequency of which are both modulated by a signal that is derived from and representative of current in the electric current circuit being protected. The device additionally includes means connected to the energy storing means for initiating a predetermined protective function when the amount of energy accumulated in that energy storing means attains a predetermined critical level indicating that an overcurrent condition has occurred in the protected circuit. With this arrangement the time required by the energy storing means to accumulate its critical amount of energy will vary as an inverse function of approximately the square of the overcurrent value.

My invention will be better understood and its various objects and advantages will be more fully appreciated from the following description taken in conjunction with the accompaying drawings in which:

FIG. 1 is a schematic diagram, partly in block form, of an overcurrent protective device embodying my invention; and FIG. 2 is a detail schematic diagram of the preferred circuitry of the components shown in block form in FIG. 1.

In FIG. 1 the electric current circuit that is subject to protection is represented by the single line 11 labeled "A.-C. line." This line transmits electric power from a source terminal 12, to which it is connected by means of a circuit interrupter or switch 13, to a load terminal 14. Automatic opening of the switch 13 is desired in delayed response to the occurrence of overcurrent or fault conditions in the line 11 or in whatever utilization apparatus or load circuit may be connected to the terminal 14. My protective means accomplishes this result by sensing the overcurrent condition and then initiating an opening operation of the switch 13 after a time delay that is inversely related to the amount of overcurrent in the line 11.

The preferred form of the protective device has been shown functionally in FIG. 1. It comprises a combination of components including current sensing and translating means 15 coupled to the line 11 and suitably arranged to derive a D.-C. signal representative of line current. The magnitude of the derived signal varies with the value of current in the protected line. This signal serves as an input quantity for other components of my device which are responsive to its magnitude.

The representative input signal is applied to a time delay circuit comprising an Adjustable Resistance element 16 in series with an energy accumulating reactance element 17, labeled "Energy Storage (Long Time)" in FIG. 1. The latter element may have either capacitive or inductive reactance. In the preferred embodiment of my invention, a diode D1 is serially included between elements 16 and 17, and the current that this diode conducts serves as an energizing signal for the reactance element 17. The magnitude of this signal will depend on the magnitude of the input signal and the adjustment of the resistance element 16. Whether the diode D1 is conductive or not is dependent on the state of supervising means 19 which has been illustrated symbolically in FIG. 1 as an "AND" logic block shunting the reactance element 17.

In accordance with my invention, the supervising means 19 normally prevents the reactance element 17 from receiving any appreciable amount of energy from the input signal. But intermittently the state of the supervising means is changed to one enabling the element 17 to accumulate energy from the input signal. This is accomplished by transmitting to the supervising means a pulsating control signal produced by periodically operative control means 20a and 20b, with the supervising means being arranged to change from its normal state to its enabling state in response to each control signal pulse.

The illustrated control means comprises a frequency-modulated pulse generator 20a and a slave pulsing circuit with pulse width control 20b. The generator 20a is energized by the representative input signal and is arranged to operate with a frequency that depends upon the magnitude of that signal. More specifically, in the preferred embodiment of my invention the operating frequency of the generator 20a varies linearly with the magnitude of the input signal. However, each of the successive periods throughout which the generator operates will have a fixed and relatively brief duration.

The slave circuit 20b operates in synchronism with operation of the generator 20a to produce a train of control pulses of predetermined duration. While the slave circuit 20b provides advantageous means for controlling the width of each pulse of the control signal (by which means the whole protective device can conveniently be calibrated), it is not essential to the successful practice of my invention. The inclusion of this particular component is in fact the invention of F. L. Steen and is claimed in his copending patent application S.N. 361,520, filed Apr. 21, 1964, and assigned to the assignee of the present application.

It will now be apparent that the supervising means 19 permits the energization of element 17 through the diode D1 to be effected only during intermittent periods of relatively brief duration, which periods occur at a rate determined by the operating frequency of the generator 20a. Therefore the reactance element 17 is supplied with a succession of discrete energizing pulses the amplitude of which is modulated by the input signal and the frequency of which is also modulated by the input signal. The energy that the element 17 incrementally receives and accumulates in this fashion is blocked by the diode D1 from being dissipated through the supervising means 19 during those recurrent intervals when no control signal is provided and the supervising means is in its normal state.

When the reactance element 17 has been so energized for a sufficient length of time to increase the energy accumulated therein to a predetermined critical level, a level detector 21 connected thereto operates to produce an output signal for opening the switch 13 in the protected line 11, thereby disconnecting the line from its power source. The time required for the energy accumulated in element 17 to attain this critical level, following the occurrence of an overcurrent condition, will be inversely related to approximately the second power of the overcurrent magnitude. As will be further explained hereinafter, this $I^2t=K$ operating characteristic is obtained because both the magnitude and the frequency of the pulsating energizing signal vary in accordance with the magnitude of the input signal which in turn is determined by the amount of overcurrent.

In the illustrated embodiment of my invention a number of other functional components are associated with the basic ones described above. For example, additional supervising means 22, illustrated symbolically as an "AND" logic block shunting the reactance element 17, is provided for starting and resetting the time delay circuit. This supervising means is arranged to prevent the accumulation of more than a relatively small amount of energy in the reactance element 17 so long as an associated level detector (low set) 23 is inoperative and to permit appreciable energy accumulation only while the level detector 23 is operating. Consequently no energy can begin to accumulate in element 17 until the level detector 23 operates (picks up), and any energy stored in this element when the level detector 23 subsequently stops operating (drops out) will quickly be dissipated through the supervising means 22, thereby resetting the time delay circuit. As taught by Steen in his previously mentioned copending patent application, the low set level detector 23 is also used to control means for suppressing operation of the frequency-modulated pulse generator 20a except when the level detector is operating, whereby this level detector must be in operation in order for a pulsating control signal to be transmitted to the supervising means 19.

Operation of the low set level detector 23 is controlled by the representative input signal: it is inoperative so long as the magnitude of the input signal reflects normal full load current in the protected line 11; it is operative in response to the input signal magnitude attaining a predetermined pickup level corresponding to a predetermined overcurrent condition in the line; and it operates continuously so long as the signal magnitude exceeds the aforesaid pickup level. Toward this end the level detector 23 is energized by the input signal and by a constant-magnitude D.-C. reference voltage with which the variable magnitude input signal can be compared, and the level detector is arranged to operate whenever this comparison indicates that pickup magnitude has been reached. The reference voltage is obtained from a Regulator component 24 connected to the D.-C. input signal deriving means 15, with isolating diodes D2 and D3 being provided as shown. Reliability of the protective device is improved under low-grade overcurrent conditions by also connecting the regulator 24 to an alternative source comprising a Potential Sensor and Rectifier 25 for deriving a D.-C. signal from the electric power source voltage at the switch 13.

As can be seen in FIG. 1, the regulated D.-C. reference voltage is supplied to various components of the protective device in addition to the level detector 23, including the previously mentioned level detecting means 21 and yet another level detector (high set) 28. The high set level detector 28 is connected to 15 for energization by the representative input signal, and it is arranged to operate in response to the magnitude of this signal attaining a desired pickup level that is higher than the pickup level to which the low set lever detector 23 responds. When operative, the high set level detector 28 effects the application of the D.-C. reference voltage to a second time delay circuit comprising an Adjustable Resistance element 29 in series with an energy accumulating reactance element 30, labeled "Energy Storage (Short Time)" in FIG. 1.

The reactance element 30 is connected via an isolating diode D4 to the level detector 21 which responds to the accumulation of a predetermined critical level of energy in the element 30 by producing an output signal to open the switch 13. The reactance element 30 is selected to have a smaller energy storing capacity than the reactance element 17 in the previously described time delay circuit 16, 17, and the associated parameters (including the adjustment of the resistance element 29) are so chosen that once level detector 28 operates the energy accumulated in the element 30 attains a level required to activate the level detector 21 faster than the energy accumulating in the element 17 can build up to its critical level. Thus the time delay circuit comprising elements 29 and 30 performs a short time protective function in response to those severe, high-overcurrent fault conditions that cause the level detector 28 to operate.

As is shown in FIG. 1, not only the level detector 21 but also the resetting or supervising means 22 is common to both short and long time delay circuits. Independent timing by the two reactance elements 30 and 17 is nevertheless ensured by including isolating diodes D4 and D5 in their respective connections to the level detector 21. The supervising means 22 is connected to the common electrodes of these diodes and quickly dissipates any energy accumulated in either of the elements 30 and 17 when the low set level detector 23 stops operating (drops out). This particular component operation is part of the claimed subject matter of the above-mentioned copending patent application of F. L. Steen.

In the illustrated embodiment of my protective device, the level detector 21 has periodically active sampling means 31 associated therewith for effecting at frequently recurring intervals a momentary increase in its sensitivity. This arrangement embraces the teaching of C. A. Mathews, for which see his copending patent application S.N. 128,472, filed Aug. 1, 1961 (now Patent No. 3,179,-850, granted April 20, 1965), and assigned to the assignee of the present application. The sampling means 31, as it is shown in FIG. 1, is controlled by the control means 20a and 20b and is therefore activated each time the supervising means 19 is changed from its normal state to its state enabling the reactance element 17 to receive energy from the representative input signal.

Turning now to FIG. 2, a detail circuit diagram is presented of the preferred embodiment of the protective device shown functionally in FIG. 1. As has already been explained, this device is designed to initiate a predetermined control function (such as opening the switch 13 in order to disconnect the protected circuit 11 from its power source 12) in delayed response to the occurrence of an abnormal circuit condition. A 3-wire polyphase A.-C. circuit or line 11 is shown in FIG. 2, and the protective device is energized in accordance with a characteristic circuit quantity whose value, beyond a given normal value, reflects both the occurrence and the severity of the abnormal condition to which the device responds. In the illustrated application of the protective device, this characteristic quantity is alternating current, and therefore the device is adapted to be coupled to the wires of circuit 11 by means of suitable current sensors 40a, 40b, and 40c which respectively develop secondary voltages proportional to A.-C. line currents in the associated wires. The current sensors 40a, 40b, and 40c are respectively connected to full wave rectifiers 41a, 41b, and 41c, and this combination comprises the current sensing and translating means 15 of FIG. 1.

As can be seen in FIG. 2, the negative D.-C. terminals of the full wave rectifiers 41a, 41b, and 41c are all connected to a common bus N, while the positive D.-C. terminals of these rectifiers are all connected by way of a wire 42 and the respective diodes D2 and D3 to the regulator 24 and to a representative signal bus V. The illustrated regulator comprises a voltage dropping impedance element, such as a resistor 43, connected in series with a Zener diode Z1 between the diode D2 and the common bus N, with a smoothing capacitor 44 connected in parallel relation to the Zener diode Z1. A reference or supply voltage bus P is connected to the junction between the resistor 43 and the Zener diode Z1. The Zener diode has a characteristic breakdown voltage of predetermined magnitude, e.g., 20 volts, and assuming that the peak magnitude of voltage energizing the regulator 24 is greater than this predetermined magnitude, the bus P is maintained, with respect to the common bus N, at a substantially constant positive potential equal to this breakdown voltage.

The bus V is connected to the diode D3 for energization, with respect to the common bus N, by a positive unipolarity voltage the magnitude of which corresponds to the highest instantaneous magnitude of the voltages derived by the current sensors 40a, 40b, and 40c. Preferably a smoothing capacitor 45 having a low capacitive value relative to the capacitor 44 is connected between the buses V and N. The potential of the bus V is therefore representative of the value of current in the protected circuit 11, and it comprises the D.-C. input signal for the time delay circuit 16, 17 and for the pulse generator 20a, as well as for the low and high set level detectors 23 and 28 of the illustrated protective device.

FIG. 2 shows a variable resistor R1 (the adjustable resistance element 16 of FIG. 1), a diode D1, and a normally discharged timing capacitor C1 (the long time energy storage element 17 of FIG. 1) connected in series between the variable voltage bus V and the common bus N. The diode D1 is poled to conduct charging current for the capacitor C1. An NPN transistor Q1, comprising the supervising means 19 of FIG. 1, is connected in parallel circuit relationship with the series combination of diode D1 and capacitor C1, and while this transistor is "on" the diode D1 will not conduct capacitor charging current.

The transistor Q1 has an emitter, a collector, and a base electrode connected, respectively to the common bus N, to the anode of the diode D1, and to the supply voltage bus P. As is shown in FIG. 2, the collector of Q1 is connected to the anode of D1 by way of a resistor 46 of relatively low resistance and an isolating diode 47, and a resistor 48 is connected between the junction of these elements and the bus P. The base electrode of Q1 is connected to P by way of a current limiting resistor 49, and a clamping diode 50 interconnecting the base of Q1 and the bus N is poled to prevent the potential at this electrode from going appreciably more negative than N. As so connected the transistor Q1 is normally biased "on," that is, it is normally forward biased to a conductive state. Consequently it normally forms a low-impedance shunt path clamping the anode of the diode D1 to the common bus N, and the voltage on bus V cannot then effect charging of the timing capacitor C1.

The base electrode of the transistor Q1 is capacitively coupled to the periodically operative control means 20a, 20b. Q1 is recurrently switched "off" by a negative pulse produced upon operation of this control means. The control means includes the frequency-modulated pulse generator 20a and the slave pulsing circuit 20b. Preferably the pulse generator 20a comprises a unijunction transistor Q2 having a capacitor 51 connected across its emitter-base-one junction, with the interbase circuit of Q2 being connected between the two buses P and N and with the emitter of Q2 being connected to a resistor 52 for energization in accordance with the voltage on the variable voltage bus V. As is shown in FIG. 2, base-one and base-two of Q2 are connected to N and P by way of resistors 53 and 54, respectively, and a resistor 55 is connected between the supply voltage bus P and the emitter of Q2. As so arranged, and with an appropriate selection of parameters, the unijunction transistor Q2 operates in a relaxation oscillator mode at a frequency that varies linearly with variations in the magnitude of the variable voltage energizing the bus V. It can be designed to operate, for example, over a range of 70–1,000 cycles per second. A frequency-modulated oscillator of this kind is the subject matter of Patent 2,826,696, Suran, granted on Mar. 11, 1958, and assigned to the assignee of the present application.

Each oscillation of the unijunction transistor pulse generator 20a during an overcurrent condition in the protected circuit 11 causes a negative-going pulse of brief duration to be transmitted to the base electrode of the transistor Q1, whereupon Q1 becomes reversely biased and momentarily changes to a high-impedance inactive state enabling the diode D1 to conduct. Thus an increment of charge is added to the timing capacitor C1. The repetition rate of successive charging increments is directly proportional to the operating frequency of the oscillator 20a which in turn depends on the magnitude of the variable input voltage, and initially the amount of each increment is also proportional to the magnitude of this voltage. It is apparent therefore that the average charging current seen by the capacitor C1 will be a function of approximately the second power of the variable input voltage.

By incrementally charging the timing capacitor C1 in this fashion, its voltage is increased in a succession of small, discrete steps. Between the intermittent periods during which capacitor charging is effected, the diode D1 is reversely biased and will prevent discharge of C1 through the transistor Q1 which is then in its normal conductive state. The voltage across the capacitor C1 therefore rises inexorably, and electric energy will accumulate in C1 until the energy stored therein attains a predetermined critical level at which the capacitor voltage is sufficient to fire the level detector 21 that is connected thereto.

In FIG. 2 the level detector 21 is shown as a unijunction transistor Q3. Base-one of the unijunction transistor Q3 is connected to the common bus N by way of a resistor 56, base-two is connected to the supply voltage bus P by way of a resistor 57, and the emitter of Q3 is connected to the relatively positive terminal of the timing capacitor C1 by way of the isolating diode D5. A resistor 58 of very high resistance is connected between the bus P and the emitter of Q3 as shown. Whenever the voltage across capacitor C1 increases to a predetermined critical magnitude, corresponding to the peak point emitter voltage of the unijunction transistor Q3 (e.g. 9.5 volts), Q3 is activated or fired, thereby abruptly changing its emitter-base-one impedance from a very high to a relatively low value. This operation is used to initiate opening of the switch 13, thereby disconnecting the protected circuit 11 from its power source 12. At the same time the capacitor C1 is quickly discharged through a path including the then low-impedance emitter-base-one junction of the unijunction transistor Q3.

The time $t$ required to activate the unijunction transistor level detector 21 of the protective device, following the occurrence of an overcurrent condition in the protected circuit, depends on the magnitude of the variable voltage on bus V and on the effective time constant of the time delay circuit R1, C1. The variable voltage magnitude is determined by the amount of current I in the circuit, and the higher the current the faster the timing capacitor C1 charges to its critical voltage level. The effective time constant of the time delay circuit is proportional to $RC/X$ where R is the value of resistance introduced in the circuit by element R1, C is the capacitive value of the capacitor C1, and X is a ratio of the on time to the on-and-off time for effecting capacitor charging. X can also be expressed as the product of the variable operating frequency (in cycles per second) of the pulse generator 20a and the fixed duration (in seconds) of each control signal pulse in response to which the supervising means 19 permits charging-current conduction by the intermittently conductive diode D1. Since the frequency of the pulse generator 20a is dependent upon the magnitude of the variable voltage at V and is thus determined by the overcurrent I, it is apparent that the effective time constant of this time delay circuit decreases with increasing amounts of overcurrent in the protected circuit. The shorter the effective time constant the faster the capacitor C1 charges to its critical voltage level. Consequently, the operating characteristic of the protective device approaches the desired $I^2t=K$.

Parameters of the above-described circuitry are chosen to give whatever amount of time delay is desired at a predetermined reference amount of overcurrent (for example, a delay of about 15 seconds at an overcurrent magnitude of six per unit). This is accomplished by appropriately selecting the capacitance of element C1, the resistance used at R1, and the pulse-duration and reference frequency of the control signal pulses supplied to the supervising means 19 by the control means 20a, 20b. If the selected values of the individual components of the device have their usual tolerances, the timing actually obtained may not precisely correspond to that desired without calibrating the device by finely adjusting the duration of each control signal pulse, for which purpose the slave pulsing circuit 20b is provided.

As can be seen in FIG. 2, the slave pulsing circuit 20b comprises a capacitor 60 of relatively small capacitive value connected between the common bus N and the cathode of a diode 61 whose anode is connected to base-one of the unijunction transistor Q2 comprising the frequency-modulated pulse generator 20a. Thus the capacitor 60 is charged by the pulse train that Q2 generates when operating in its relaxation oscillator mode. The relatively positive terminal of the capacitor 60 is connected by way of a resistor 62 to the base electrode of an NPN transistor Q4 whose emitter is connected directly to the common bus N and whose collector is connected through a resistor 64 to the supply voltage bus P. A base resistor 63 is connected across the emitter-base junction of Q4, and this transistor will be in a non-conductive or inactive state except when the capacitor 60 is in its charged condition. The collector of Q4 is capacitively coupled, by means of a capacitor 65 in series with a resistor 66, to the base of the transistor Q1 comprising the supervising means 19. Each time the transistor Q4 is activated the potential at its collector changes negatively, thereby producing at the base of Q1 the control signal pulse that turns off Q1. So long as this pulse subsists the transistor Q1 is biased off and the diode D1 is able to conduct charging current for the timing capacitor C1.

The duration or width of each control signal pulse produced by the transistor Q4, and hence the duration of each charging increment to which the timing capacitor C1 is subjected, depends on the length of time that the capacitor 60 remains charged each time the unijunction transistor Q2 is fired. Discharge of the capacitor 60 following each firing of Q2 is controlled by the resistor 62 and also by a variable resistor 67 connected across the capacitor 60 as shown. The desired pulse width is obtained by judiciously selecting the resistive value of 62 and 67, and this width can be conveniently changed (over a range of 15-100 microseconds, for example) by appropriately adjusting the amount of resistance at 67. With this arrangement a substantially constant pulse width is obtained, and the protective device will have unusually good temperature stability qualities.

In the illustrated embodiment of the present invention, the above-described slave pulsing circuit 20b is also used to control sampling means for effecting momentary increases in the sensitivity of the unijunction transistor level detector 21. This has been accomplished by connecting a capacitor 68, in series with a resistor 69, between the collector of the transistor Q4 and base-two of the unijunction transistor Q3. The unijunction transistor Q3 has a nominal peak point emitter voltage of relatively high value (e.g. 10 volts), but each time the associated transistor Q4 is activated the interbase voltage of Q3, being capacitively coupled to Q4, will be sufficiently depressed to reduce the peak point emitter voltage to the above-mentioned critical level (e.g., 9.5 volts) required to activate the level detector 21. By periodically increasing the sensitivity of the level detector in this manner, a desirable reduction in the size of the timing capacitor C1 can be realized without "stalling" the unijunction transistor Q3 during low-grade overcurrent conditions. The possibility of stalling and the operation and the advantages of the periodically active sampling means are further explained in the copending Mathews application S.N. 128,472 referred to hereinbefore.

As is illustrated in FIG. 2, the protective function that is initiated upon activation of the level detector 21 is performed by means of a solid state controlled switch SCS1. This device is a four layer (PNPN) device known in the art as a silicon controlled switch. Its anode is connected by way of a resistor 70 to the supply voltage bus P, its cathode is connected to the common bus N, and its cathode gate is connected to the junction of two resistors 71 and 72 which are connected in series between base-one of the unijunction transistor Q3 and the common bus N. Until fired by a forward bias current in its cathode gate, SCS1 blocks current flow in both directions and hence is in effect an open circuit. When fired, however, it will abruptly change to a low-forward-impedance state that enables appreciable current to flow in its anode-cathode circuit. Once turned on, the switch will remain conductive until its anode current is reduced below a predetermined minimum value known as the "holding current."

Upon activation of the unijunction transistor Q3, the cathode gate of the switch SCS1 is supplied with bias current of appropriate magnitude and duration to turn on this switch. Suitable means 73 connected in the anode-cathode circuit of SCS1 responds to the resulting conduction by actuating the switch 13 in the protected circuit 11. In FIG. 2 the means 73 is shown in block form connected in parallel circuit relationship with the anode resistor 70, and it may comprise for example an electroresponsive element the energization of which actuates the opening mechanism of the switch 13. The switch 13 is also shown in block form in FIG. 2, and it may comprise either an electromechanical circuit breaker for interrupting current in the circuit 11 or a static equivalent.

The protective device shown in FIG. 2 is also provided with starting and resetting means which will now be described. In order to maintain the timing capacitor C1 normally discharged, the cathode of the isolating diode D5 is connected to the common bus N by way of a normally forward biased diode 75 and a resistor 76 comprising the supervising means 22 of FIG. 1. So long as diode 75 is forward biased, the capacitor C1 cannot accumulate an appreciable amount of charge and the level detector 21 remains inactive. This condition will subsist until the diode 75 is reversely biased by operation of the low set level detector 23.

Preferably the level detector 23 comprises another silicon controlled switch SCS2. As can be seen in FIG. 2, the cathode of this switch is connected to the anode of the diode 75, the anode gate of the switch is connected directly to the supply voltage bus P, and the anode of the switch is connected to the junction of a resistor 77 and a variable resistor 78 forming a voltage divider across the variable voltage bus V and the common bus N. Whenever the anode voltage of SCS2 is less than a critical breakdown magnitude that is determined by the magnitude of the supply voltage applied to its anode gate, this switch is in an inoperative or inactive state (turned off). But when the anode voltage rises to the predetermined breakdown magnitude, SCS2 abruptly changes to an active state (turns on or "picks up"), whereupon the anode potential of the diode 75 is elevated to approximately that of the supply voltage bus P. This action reversely biases the diode 75 and consequently enables charging of the timing capacitor C1 to take place.

The selection of the resistive value of the resistor 78, relative to that of resistor 77, determines the pickup level that must be reached by the variable voltage on bus V to raise the anode voltage of SCS2 to its critical breakdown magnitude. The parameters might be chosen, for example, so that the level detector 23 operates in response to the variable voltage attaining a level of 28 volts, corresponding to a one per unit pickup value of current in the protected circuit 11. If the overcurrent condition in the protected circuit should subside before the protective device has time to operate, the level detector 23 will immediately revert to its normal inoperative state thereby removing the reverse bias of diode 75, whereupon any charge that may have been accumulated by the timing capacitor C1 is quickly dissipated through the diode 75 and the resistor 76, and the protective device is substantially instantaneously reset.

The above-described operation of the low set level detector 23 is also used to control conduction by a diode 79. The anode of the diode 79 is connected to the relatively positive terminal of capacitor 51 forming part of the frequency-modulated pulse generator 20a, and the cathode of diode 79 is connected by way of the resistor 76 to the common bus N, whereby the diode 79 is normally forward biased in which state it prevents appreciable charging of the capacitor 51 and therefore suppresses operation of the pulse generator. Activation of the switch SCS2 in response to the variable voltage at V attaining the predetermined pickup level will cause reverse bias of the diode 79 in the manner that was previously described in connection with the diode 75, and consequently capacitor 51 will no longer be clamped to the common bus N and the control means 20a, 20b can start producing its pulsating control signal for the supervising means 19.

In the interest of reliable operation by the various components of the protective device that derive supply voltage from the bus P, namely components 20a, 20b, 21, and 23, it is important that the supply or reference voltage on this bus have the same predetermined magnitude under all operating conditions. The supply voltage magnitude is determined by the regulator 24, and if the only source of energization for the regulator were the unipolarity voltage that is derived from the line current by the current sensing and translating means 15, a continuous supply of the requisite voltage at the bus P might not be assured under low-grade overcurrent conditions. Reliability is improved by providing an alternative source of energization of dependably high magnitude during such conditions.

Toward this end, the Zener diode Z1 of the regulator 24 is connected by way of a small resistor 80 and switch means 81 to the potential sensor and rectifier 25 which in FIG. 2 is seen to comprise a pair of potential transformers 82a and 82b and four diodes 83. The primary windings of the transformers 82a and 82b are connected in open-delta configuration to the 3-wire circuit that connects the polyphase electric power source 12 to the switch 13, and the voltage across the secondary winding of each transformer is therefore proportional to line-to-line A.-C. voltage across the wires to which the associated primary winding is connected. Each secondary winding is center tapped, and its opposite ends are respectively connected to two of the diodes 83 to form a full-wave rectifier with the center tap comprising the negative D.-C. output terminal thereof. The negative D.-C. terminals of these full-wave rectifiers are connected to the common bus N, while the positive D.-C. terminals of the rectifiers are both connected to the switch means 81 and hence to the regulator 24. The switch means 81 is arranged to be in a low impedance state (as shown) when the switch 13 is closed and to be in a high impedance state when the switch 13 is open.

When the protected circuit 11 is sound or is subject to only a small amount of overcurrent (e.g., a value of just one per unit), the rectified voltage applied to the regulator 24 by the alternative source 25 has an amply high magnitude to ensure that the supply voltage on bus P is continuously maintained at the substantially constant magnitude determined by Z1. On the other hand, if the amount of overcurrent in the protected circuit is large the output voltage of 25 may fall to a relatively low magnitude, but then the voltage applied to the regular 24 by the source 15 will have an amply high magnitude to ensure the requisite supply voltage. The variable voltage bus V is isolated from the potential source 25 by the diode D2 as shown.

In the interest of security, it is important whenever the protective device is initially energized that the supply or reference voltage at the bus P rise to its assigned magnitude nearly as fast as voltage increases on the variable voltage bus V. If the smoothing capacitor 44 were connected directly across the Zener diode Z1, the rise of supply voltage in the above circumstance might be undesirably delayed. But the smoothing capacitor 44 is not so connected. As can be seen in FIG. 2, its relatively positive terminal is connected by way of a resistor 84 to the cathode of the diode D2, and another diode 85 has been provided between the same terminal and the supply voltage bus P. The diode 85 is poled to enable the capacitor 44 to discharge into the bus P and thereby perform its smoothing function without impeding the initial rise of supply voltage to the regulated magnitude determined by Z1. This is another feature of the above-mentioned copending Steen application.

For relatively severe overcurrent or fault conditions, the illustrated protective device has a "short time" operating characteristic that is obtained by means of an additional channel of operation comprising a high set level detector 28 and time delay means 29, 30. As it is shown in FIG. 2, the high set level detector preferably comprises another silicon controlled switch SCS3. The cathode of this switch is connected by way of a resistor 86 to the common bus N, the anode gate of the switch is connected directly to the supply voltage bus P, and the anode of the switch is connected to the junction of a resistor 87 and a variable resistor 88 forming a voltage divider across the variable voltage bus V and the common bus N. The relevant parameters might be chosen, for example, so that SCS3 is activated (picks up) when the magnitude of the variable voltage on the bus V rises to a predetermined relatively high pickup level corresponding to a nine per unit value of overcurrent in the protected circuit 11.

A series RC circuit comprising a variable resistor R2 (the adjustable resistance element 29 of FIG. 1) and a normally discharged capacitor C2 (the short time energy accumulating reactance element 30 of FIG. 1) is connected between the cathode of the switch SCS3 and the common bus N. Upon activation of SCS3, this RC circuit will be energized by a voltage approximately equal in magnitude to the supply voltage on bus P. The relatively positive terminal of capacitor C2 is connected via the isolating diode D4 to the emitter of the unijunction transistor Q3 comprising the level detector 21 that has been described hereinbefore. The level detector 21 is activated in response to the capacitor C2 being energized enough to increase its charge to a predetermined critical level at which the voltage across this capacitor attains the magnitude required to fire Q3, whereupon the desired operation of the silicon controlled switch SCS1 and the electroresponsive element 73 is initiated in the manner previously explained.

The time required to activate the unijunction transistor level detector 21 of the protective device, following the occurrence of a high overcurrent condition of sufficient severity to cause operation of the level detector 28, is determined by the time constant of the time delay circuit R2, C2. The resistive value of R2 and the capacitive value of C2 are chosen to give however short a time delay is desired under such conditions. Substantially instantaneous operation can be obtained by using an appropriately low resistance at R2.

While I have shown and described a preferred form of my invention by way of illustration, many modifications may occur to those skilled in the art. It is contemplated, therefore, by the claims that conclude this specification to cover all such modifications as fall within the true spirit and scope of the invention.

What I claim as new and desire to secure by letters patent of the United States is:

1. A protective device comprising:
   (a) means adapted to be coupled to an electric current circuit for deriving therefrom a signal representative of circuit current;
   (b) electric energy storing means;
   (c) means responsive to said signal for supplying to said energy storing means a succession of fixed duration energizing pulses the amplitude and frequency of which are both modulated by the signal; and
   (d) means connected to said energy storing means for initiating a predetermined protective function when the energy accumulated in said energy storing means attains a predetermined critical level.

2. Means for initiating a predetermined control function in delayed response to the occurrence of an abnormal condition in an electric current circuit, comprising:
   (a) means adapted to be coupled to the circuit for deriving therefrom a D.-C. signal having a magnitude dependent upon the value of a characteristic electric quantity of the circuit;
   (b) time delay means including a capacitor;
   (c) means responsive to said signal for incrementally charging said capacitor, the repetition rate of the charging increments being proportional to the signal magnitude, the duration of each of said increments being relatively constant, and the magnitude of each increment being a function of the signal magnitude; and
   (d) means connected to said capacitor for initiating a predetermined control function in response to the capacitor being charged a predetermined amount.

3. Protective means having an inverse-time-over-current operating characteristic comprising:
   (a) means adapted to be coupled to an alternating current circuit for developing a pulsating D.-C. energizing signal whose frequency and magnitude both vary with the value of said alternating current;
   (b) means for transmitting said signal to an electric energy accumulating reactance element; and
   (c) level detecting means connected to said element for producing an output signal in response to energization of the element by said energizing signal for a sufficient length of time to increase the energy accumulated therein to a predetemined critical level.

4. Overcurrent protective means comprising:
   (a) means adapted to be coupled to an electric current circuit for deriving therefrom a signal representative of circuit current;
   (b) periodically operative control means connected to said signal deriving means and arranged to operate with a frequency that depends upon the magnitude of said signal;
   (c) electric energy storing means;
   (d) means for effecting energization of said energy storing means in accordance with the magnitude of said signal during intermittent periods of relatively brief duration, said periods occurring at a rate determined by the operating frequency of said control means; and
   (e) means connected to said energy storing means for producing an output signal when the energy accumulated in said energy storing means attains a predetermined critical level.

5. A protective device comprising:
   (a) means adapted to be coupled to an electric current circuit for deriving a unipolarity voltage having a magnitude dependent upon the value of a characteristic electric quantity of the circuit;
   (b) a timing capacitor connected to said first-mentioned means for energization by said voltage when the voltage magnitude exceeds a predetermined pickup level;
   (c) means recurrently preventing said energization of said capacitor during intervals whose frequency and duration respectively increases and decreases with increasing voltage magnitude; and
   (d) means connected to said capacitor for initiating a predetermined control function in response to the capacitor being energized enough to increase its charge to a predetermined critical level.

6. Protective means having an inverse-time-overcurrent operating characteristic comprising:
(a) means adapted to be coupled to a source of alternating current for deriving therefrom a D.-C. input signal having a magnitude that varies with the value of alternating current;
(b) a time delay circuit, including an energy accumulating reactance element, connected to the input signal deriving means for energization by said input signal;
(c) supervising means associated with said time delay circuit, said supervising means normally being in a state to prevent said element from receiving energy from said input signal;
(d) pulse generating means connected to said input signal deriving means for providing a pulsating control signal having a frequency that varies with the magnitude of said input signal;
(e) said control signal being transmitted to said supervising means which responds thereto by changing its state to one enabling said element to accumulate energy from said input signal; and
(f) a level detector connected to said element and arranged to operate in response to the accumulation by the element of a predetermined critical level of energy.

7. A protective device comprising:
(a) means adapted to be coupled to an electric current circuit for deriving therefrom a representative D.-C. signal;
(b) a time delay circuit comprising a resistance element, a diode, and a normally discharged capacitor connected in series to the first-mentioned means for energization by said signal;
(c) supervising means connected in parallel circuit relationship with the series combination of said diode and said capacitor, said supervising means normally being in a low-impedance conductive state to prevent appreciable charging of said capacitor by said signal;
(d) periodically operative means connected to said first-mentioned means and to said supervising means and arranged to operate with a frequency dependent upon the magnitude of said signal;
(e) said supervising means being momentarily changed to a high-impedance state, thereby permitting said signal to incrementally charge said capacitor, in response to each operation of said periodically operative means; and
(f) means connected to said capacitor for initiating a predetermined control function in response to the capacitor charge being increased to a predetermined critical level.

8. The protective device of claim 7 in which the supervising means comprises a transistor.

9. In combination:
(a) a source of unipolarity voltage of variable magnitude;
(b) a timing capacitor;
(c) a charging circuit for said capacitor, the circuit being connected directly to said source for energization by said voltage;
(d) means shunting said charging circuit for normally preventing charging of said capacitor;
(e) means for so controlling said shunting means as to permit intermittent charging of the capacitor at a rate proportional to the magnitude of said voltage; and
(f) means connected to said capacitor for performing a predetermined control function in response to voltage across the capacitor attaining a predetermined critical magnitude.

10. A circuit interrupter comprising:
(a) means adapted to be connected in an electric current circuit for interrupting current in said circuit when actuated;
(b) electric energy storing means;
(c) means responsive to the circuit current for supplying to said energy storing means a succession of fixed-duration energizing pulses the amplitude and frequency of which both vary with the value of said current; and
(d) means connected to said energy storing means for actuating the first-mentioned means when the energy accumulated in said energy storing means attains a predetermined critical level.

References Cited by the Examiner
UNITED STATES PATENTS

| 3,018,416 | 1/1962 | Karlicek et al. | 317—36 |
| 3,176,190 | 3/1965 | Hodges | 317—28 |
| 3,179,850 | 4/1965 | Mathews | 317—36 |

References Cited by the Applicant
UNITED STATES PATENTS 2,468,418  4/1949  Thumim.

MILTON O. HIRSHFIELD, *Primary Examiner.*

J. D. TRAMMELL, *Assistant Examiner.*